United States Patent
Ishii et al.

(10) Patent No.: US 8,520,081 B2
(45) Date of Patent: Aug. 27, 2013

(54) IMAGING DEVICE AND METHOD, AND IMAGE PROCESSING METHOD FOR IMAGING DEVICE

(75) Inventors: Yasunori Ishii, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 52 days.

(21) Appl. No.: 13/260,597

(22) PCT Filed: Jan. 25, 2011

(86) PCT No.: PCT/JP2011/000380
§ 371 (c)(1),
(2), (4) Date: Sep. 27, 2011

(87) PCT Pub. No.: WO2011/099239
PCT Pub. Date: Aug. 18, 2011

(65) Prior Publication Data
US 2012/0033094 A1   Feb. 9, 2012

(30) Foreign Application Priority Data
Feb. 12, 2010   (JP) .................................. 2010-029039

(51) Int. Cl.
*H04N 5/228*   (2006.01)
*H04N 5/232*   (2006.01)

(52) U.S. Cl.
USPC . 348/208.12; 348/345; 348/352; 348/208.99; 348/208.4; 348/208.6

(58) Field of Classification Search
USPC ................. 348/208.99, 208.4, 208.6, 208.12, 348/208.13, 335–357; 396/55
See application file for complete search history.

(56) References Cited

U.S. PATENT DOCUMENTS

| 6,046,768 A | * | 4/2000 | Kaneda et al. | ............. 348/208.2 |
| 6,122,447 A | * | 9/2000 | Washisu | .......................... 396/55 |

(Continued)

FOREIGN PATENT DOCUMENTS

| JP | 07-209576 A | 8/1995 |
| JP | 2001-268437 A | 9/2001 |

(Continued)

OTHER PUBLICATIONS

International Search Report for corresponding International Application No. PCT/JP2011/000380 mailed Mar. 8, 2011.

(Continued)

*Primary Examiner* — Nhan T Tran
*Assistant Examiner* — Xi Wang
(74) *Attorney, Agent, or Firm* — Renner, Otto, Boisselle & Sklar, LLP

(57) ABSTRACT

An image capture device of the present invention includes: a first image capture element 10A and a second image capture element 10B; and an optical system which is capable of forming a first image which is in focus on an image capture plane of the first image capture element 10A and forming a second image which is out of focus on an image capture plane of the second image capture element 10B. An image processing section 220 processes a signal obtained from the first image capture element 10A and a signal obtained from the second image capture element 10B and produces a restored image from an image obtained by the second image capture element 10B, the restored image having reduced camera shake blur and reduced out-of-focus blur.

9 Claims, 10 Drawing Sheets

(56) References Cited

U.S. PATENT DOCUMENTS

| | | | |
|---|---|---|---|
| 7,952,613 B2* | 5/2011 | Sekino et al. | 348/208.7 |
| 8,139,139 B2* | 3/2012 | Shintani | 348/345 |
| 2001/0031141 A1* | 10/2001 | Izukawa | 396/55 |
| 2003/0137597 A1* | 7/2003 | Sakamoto et al. | 348/371 |
| 2006/0093233 A1 | 5/2006 | Kano et al. | |
| 2007/0122132 A1* | 5/2007 | Misawa et al. | 396/55 |
| 2007/0126918 A1* | 6/2007 | Lee | 348/345 |
| 2007/0258706 A1 | 11/2007 | Raskar et al. | |
| 2008/0075441 A1* | 3/2008 | Jelinek et al. | 396/18 |
| 2008/0166115 A1* | 7/2008 | Sachs et al. | 396/55 |
| 2009/0322933 A1* | 12/2009 | Ishii | 348/345 |

FOREIGN PATENT DOCUMENTS

| | | |
|---|---|---|
| JP | 2006-129236 A | 5/2006 |
| JP | 2009-522825 T | 6/2009 |
| JP | 2010-258689 | 11/2010 |
| JP | 2010-258689 A | 11/2010 |

OTHER PUBLICATIONS

Co-pending U.S. Appl. No. 13/260,440, filed Sep. 26, 2011.
Shan et al., "High-quality Motion Deblurring from a Single Image", SIGGRAPH 2008.
Yoneji et al., "PSF Parameter Estimation for Restoration of Linear Motion Blurred Image", IPSJ SIG Technical Report, vol. 2005 No. 38, pp. 47-52, 2005 (with English abstract).
J. Bioucas-Dias, "Bayesian Wavelet-Based Image Deconvolution: A GEM Algorithm Exploiting a Class of Heavy-Tailed Priors", IEEE Trans. Image Proc., vol. 15, No. 4, pp. 937-951, Apr. 2006.
Anat Levin, "Blind Motion Deblurring Using Image Statistics", Advances in Neural Information Processing Systems (NIPS), Dec. 2006.
Fergus et al., "Removing Camera Shake from a Single Photograph", SIGGRAPH, 2006.
Japanese Office Action for corresponding Japanese Application No. 2010-029039 issued on Dec. 25, 2012 and partial English translation.

\* cited by examiner (a)

(b)

(a)

(b)

(a)

(b)

(a)

*

(b)

⇩

(c)

b (a)

(b)

(c)

(a)

(b)

(c)

IMAGING DEVICE AND METHOD, AND IMAGE PROCESSING METHOD FOR IMAGING DEVICE

TECHNICAL FIELD

The present invention relates to an image processing device and an image processing method for removal of ringing artifacts.

BACKGROUND ART

In the case of capturing an image by a digital camera, noise may sometimes be added to the image due to the characteristics of a CCD (Charge-Coupled Device) or a readout circuit for CMOS or the characteristics of transmission paths. Also, blur of an image due to an out-of-focus condition in capturing of the image or blur of an image due to camera shake occurs. In this way, the captured image has blur which is attributed to user's handling of the camera in photographing in addition to the noise which is attributed to the specific characteristics of the captured image, so that the image is degraded. Among such "blur" types, blur of an image which is attributed to a motion of a camera during photographing (exposure) is herein referred to as "motion blur", so that it is distinguishable from blur that is attributed to an out-of-focus condition (out-of-focus blur).

In recent years, especially, demand for high sensitive photography is increasing, and therefore, it is necessary to restore an image degraded by blur (hereinafter, "degraded image") to an image which is as close to an original image (hereinafter, "ideal image") as possible. To realize a bright image which is free from noise or blur, such as an image demanded in high sensitive photography, the solutions are generally divided into two ideas, increasing the sensitivity and extending the exposure time.

However, increasing the sensitivity disadvantageously leads to amplification of noise. As a result, a signal is buried in the noise so that, in many cases, large part of a resultant image is formed by the noise. On the other hand, extending the exposure time enables accumulation of a larger amount of light which occurs at that site, resulting in an image which includes smaller noise. In this case, a signal would not be buried in the noise, but there is a problem of generation of motion blur in an image due to camera shake.

According to the prior art, there are two countermeasures against the problem resulting from the extended exposure time. One is optical camera shake compensation, such as lens shift, sensor shift, or the like. The other one is obtaining the direction/magnitude of motion blur from a resultant image and performing signal processing based on the obtained direction/magnitude of the blur to restore the image (a restoration method based on signal processing). The restoration method based on signal processing is, for example, disclosed in Patent Document 1, Patent Document 2, and Non-patent Documents 1 to 5.

CITATION LIST

Patent Literature

Patent Document 1: Japanese Laid-Open Patent Publication No. 2006-129236
Patent Document 2: Japanese PCT National Phase Laid-Open Publication No. 2009-522825

Non-Patent Literature

Non-patent Document 1: Qi Shan, Jiaya Jia, and Aseem Agarwala, "High-quality Motion Deblurring from a Single Image", SIGGRAPH 2008
Non-patent Document 2: Yoneji, Tanaka, and Okutomi, "PSF Parameter Estimation for Restoration of Linear Motion Blurred Image ", IPSJ SIG Technical Report, Vol. 2005, No. 38, pp. 47-52, 2005
Non-patent Document 3: J. Bioucas-Dias, "Bayesian wavelet-based image deconvolution: a gem algorithm exploiting a class of heavy-tailed priors", IEEE Trans. Image Proc., vol. 4, pp. 937-951, April 2006
Non-patent Document 4: Levin, "Blind Motion Deblurring Using Image Statistics", Advances in Neural Information Processing Systems (NIPS), December 2006
Non-patent Document 5: Rob Fergus et al., "Removing camera shake from a single image", Barun Singh Aaron Hertzmann, SIGGRAPH 2006

SUMMARY OF INVENTION

Technical Problem

The optical camera shake compensation has a limit to the range of compensation. Therefore, when it is intended to collect a sufficient amount of light in an environment darker than a conventional one, the effective range needs to be large. However, as it becomes larger, the time delay occurs in movement. Also, increase of the dimensions encounters a physical limit to size.

The method of restoring an ideal image based on a degraded image by means of signal processing has a problem that the restored image includes noise, such as ringing artifacts. "Ringing" refers to noise which makes a uniform brightness portion of an image (flat portion) appear uneven.

FIG. 1(a) is a plan view showing an image in which the brightness changes stepwise (an ideal image near an edge). FIG. 1(b) is a graph schematically showing the brightness distribution of the image. FIG. 2(a) is a plan view showing a degraded image (blurred image) obtained by photographing the image of FIG. 1(a) using a camera. FIG. 2(b) is a graph schematically showing the brightness distribution of the image. This is herein assumed to be a result of a horizontal sideward camera shake in photographing with a camera. The degraded image of FIG. 2(a) lacks sharpness at the edge due to camera shake blur (motion blur). FIG. 3(a) is a plan view showing an image restored by signal processing based on the degraded image of FIG. 2(a). FIG. 3(b) is a graph schematically showing the brightness distribution of the restored image. The restored image of FIG. 3(a) includes a portion in which the brightness periodically varies. Such a variation in brightness is noise called "ringing".

In the method disclosed in Patent Document 1, to prevent occurrence of a ringing artifact near an edge, data of a blurred image is used near the edge, rather than using a restored result. In this method, the weight for use of the data of the blurred image is determined based on the intensity of the edge in the screen. However, the intensity of the edge cannot be determined without determining the amount of camera shake. If the intensity of the edge cannot be determined, the weight for use of the data of the blurred image cannot also be determined. This leads to a problem that ringing artifacts cannot be removed.

The present invention was conceived in order to solve the above problems. One of the objects of the present invention is to provide an image capture device which performs image processing to reduce ringing artifacts in a flat portion of an image with consideration for the human sensitivity characteristics.

Solution to Problem

An image capture device of the present invention includes: a first image capture element and a second image capture element; an optical system which is capable of forming a first image which is in focus on an image capture plane of the first image capture element and forming a second image which is out of focus on an image capture plane of the second image capture element; and an image processing section for processing a signal obtained from the first image capture element and a signal obtained from the second image capture element, wherein the image processing section produces a restored image from images obtained by the first image capture element and the second image capture element, the restored image having reduced camera shake blur and reduced out-of-focus blur.

In a preferred embodiment, the image capture device further includes a memory for storing a point spread function which defines out-of-focus blur in the second image capture element, wherein the image processing section retrieves from the memory a point spread function which defines out-of-focus blur caused during image capture and uses the retrieved point spread function for production of the restored image.

In a preferred embodiment, the optical system includes a focus lens, and a beam splitter for splitting light transmitted through the focus lens into two beams traveling in different directions, wherein one of the split beams enters the first image capture element while the other enters the second image capture element.

In a preferred embodiment, an optical distance from the focus lens to the first image capture element is different from an optical distance from the focus lens to the second image capture element.

In a preferred embodiment, the optical system includes a beam splitter for splitting incoming light into two beams traveling in different directions, a first focus lens for condensing one of the split beams on the first image capture element, and a second focus lens for condensing the other one of the split beams on the second image capture element.

In a preferred embodiment, the image capture device further includes a display section, wherein an image obtained by the first image capture element is displayed in the display section.

A program of the present invention is for controlling an operation of an image capture device, the image capture device including a first image capture element and a second image capture element, an optical system which is capable of forming a first image which is in focus on an image capture plane of the first image capture element and forming a second image which is out of focus on an image capture plane of the second image capture element, and an image processing section for processing a signal obtained from the first image capture element and a signal obtained from the second image capture element. The program includes the steps of: controlling the optical system to form a first image which is in focus on the image capture plane of the first image capture element and a second image which is out of focus on the image capture plane of the second image capture element; and instructing the image processing section to produce a restored image from images obtained by the first image capture element and the second image capture element, the restored image having reduced camera shake blur and reduced out-of-focus blur.

An image processing method of the present invention is for an image capture device, the image capture device including a first image capture element and a second image capture element, an optical system which is capable of forming a first image which is in focus on an image capture plane of the first image capture element and forming a second image which is out of focus on an image capture plane of the second image capture element, and an image processing section for processing a signal obtained from the first image capture element and a signal obtained from the second image capture element. The method includes the steps of: controlling the optical system to form a first image which is in focus on the image capture plane of the first image capture element and a second image which is out of focus on the image capture plane of the second image capture element; and instructing the image processing section to produce a restored image from images obtained by the first image capture element and the second image capture element, the restored image having reduced camera shake blur and reduced out-of-focus blur.

Another image processing method of the present invention is for an image capture device, the image capture device including a first image capture element and a second image capture element, an optical system which is capable of forming a first image which is in focus on an image capture plane of the first image capture element and forming a second image which is out of focus on an image capture plane of the second image capture element, and an image processing section for processing a signal obtained from the first image capture element and a signal obtained from the second image capture element. The method includes the steps of: controlling the optical system to form a first image which is out of focus on the image capture plane of the first image capture element and a second image which is out of focus on the image capture plane of the second image capture element; and instructing the image processing section to produce a restored image from images obtained by the first image capture element and the second image capture element, the restored image having reduced camera shake blur and reduced out-of-focus blur.

Advantageouos Effects of Invention

According to the present invention, ringing artifacts which occur particularly in a flat portion of an image can be reduced.

DESCRIPTION OF EMBODIMENTS

Figure 1:
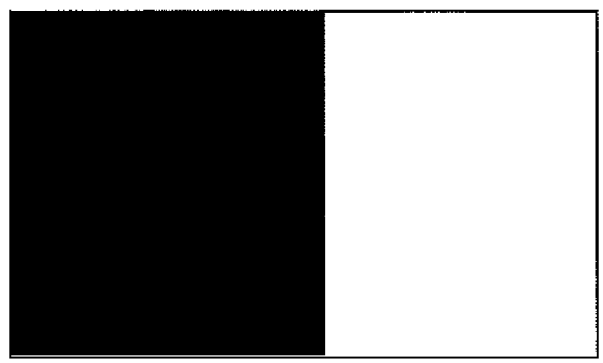
FIG. 1(a) is a plan view showing an image in which the brightness changes stepwise (an ideal image near an edge).
FIG. 1(b) is a graph schematically showing the brightness distribution of the image.
Figure 1:
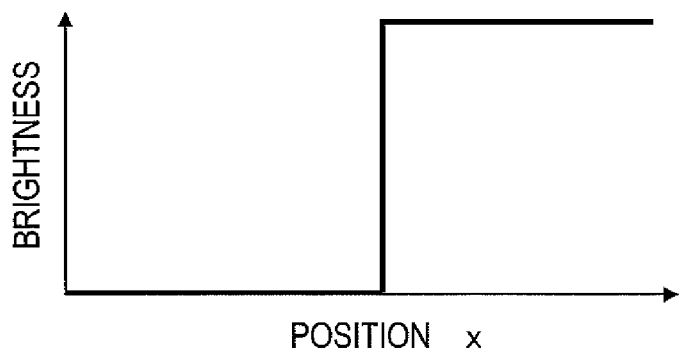
Figure 2:
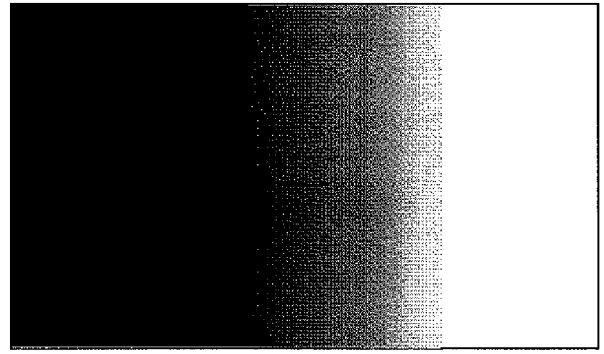
FIG. 2(a) is a plan view showing a degraded image (blurred image) obtained by photographing the image of FIG. 1(a) using a camera.
FIG. 2(b) is a graph schematically showing the brightness distribution of the image.
Figure 2:
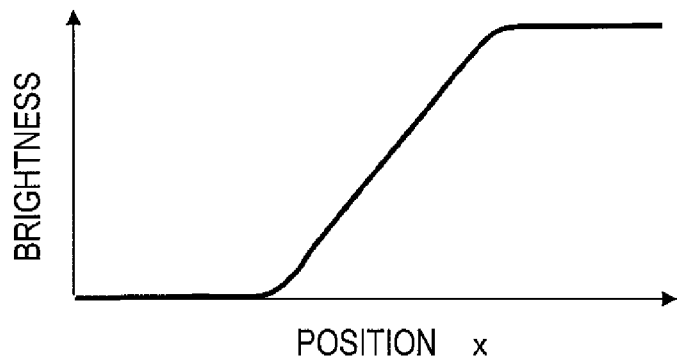
Figure 3:
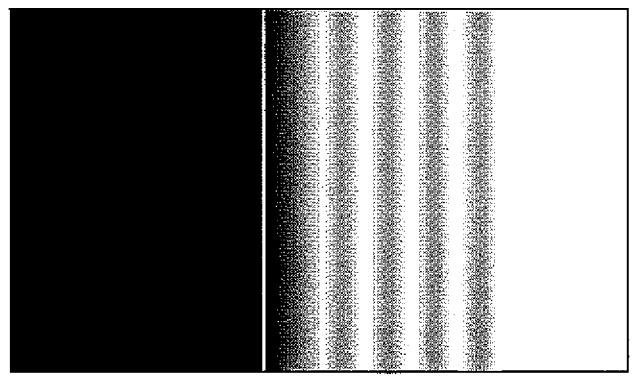
FIG. 3(a) is a plan view showing an image restored by signal processing from the degraded image of FIG. 2(a).
FIG. 3(b) is a graph schematically showing the brightness distribution of the restored image.
Figure 3:
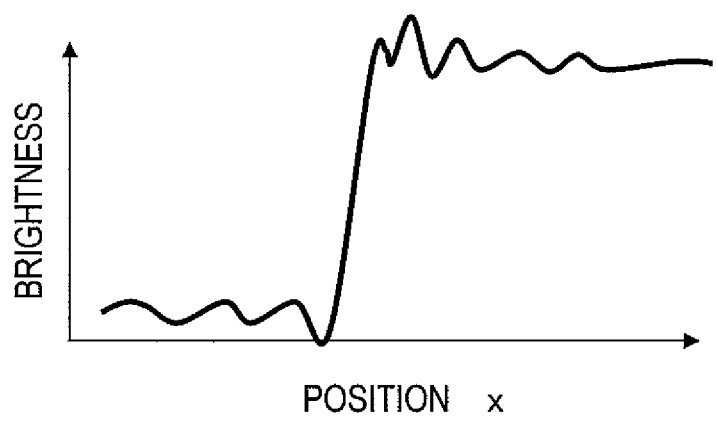

Prior to the description of embodiments of the present invention, the basic principle of the present invention is described.

In this specification, the brightness distribution of an image formed on an image capture plane is expressed by i(x,y). The coordinates (x,y) are two-dimensional coordinates which are indicative of the position of a pixel (photosensitive cell) on the image capture plane. In the case of an image formed by, for example, M×N pixels which are arranged in rows and columns, assuming that x and y are integers which satisfy the relationships of $0 \leq x \leq M-1$ and $0 \leq y \leq N-1$, respectively, the position of each one of the pixels that form the image can be specified by the coordinates (x,y). Here, it is assumed that the origin of the coordinate system, (0,0), is at the left upper corner of the image. The x axis extends in a vertical direction. The y axis extends in a horizontal direction. Note that the arrangement of the coordinates is arbitrary.

Where the brightness distribution of an unblurred image (ideal image or original image) is s(x,y) and the PSF (Point Spread Function) which defines the blur is f(x,y), Formula 1 shown below holds:

[Expression 1]

$$i(x,y) = s(x,y) * f(x,y) \quad \text{(Formula 1)}$$

where symbol "*" means convolution. In general, Formula 1 is expressed by Formula 2 shown below.

[Expression 2]

$$s(x,y) * f(x,y) = \int_{-\infty}^{\infty}\int_{-\infty}^{\infty} s(j,k) f(x-j, y-k) \, dj \, dk \quad \text{(Formula 2)}$$

When the image is formed by M×N pixels, Formula 2 shown above is expressed by Formula 3 shown below.

[Expression 3]

$$s(x,y) * f(x,y) = \frac{1}{M \times N} \sum_{j=0}^{M-1} \sum_{k=0}^{N-1} s(j,k) f(x-j, y-k) \quad \text{(Formula 3)}$$

If the function f(x,y) that is the point spread function PSF of blur is known, the unblurred image s(x,y) can be restored by deconvolution of an image i(x,y) which is photographed by a camera. If f(x,y) is unknown, it is necessary to estimate f(x,y) from the image before obtaining s(x,y).

In general, the Fourier transform of the convolution of two functions is expressed by the product of the Fourier transforms of the respective functions. Therefore, where the Fourier transforms of i(x,y), s(x,y) and f(x,y) are expressed by I(u,v), S(u,v) and F(u,v), respectively, Formula 4 shown below is derived from Formula 1. Note that (u,v) represents the coordinates in a frequency space, which respectively correspond to the spatial frequencies of the x direction and the y direction in a real image.

[Expression 4]

$$I(u,v) = S(u,v) \cdot F(u,v) \quad \text{(Formula 4)}$$

where symbol "·" means "multiplication" of the functions in the frequency space.

Formula 4 can be deformed to obtain Formula 5 shown below.

[Expression 5]

$$S(u, v) = \frac{I(u, v)}{F(u, v)} \quad \text{(Formula 5)}$$

This Formula 5 means that a function obtained by dividing I(u,v), which is the Fourier transform of the image i(x,y) photographed by a camera, by F(u,v), which is the Fourier transform of the point spread function PSF f(x,y), is equivalent to the Fourier transform S(u,v) of the ideal image s(x,y). In short, if I(u,v) and f(u,v) are determined, S(u,v) will also be determined. Since I(u,v) is the Fourier transform of an image photographed by a camera (degraded image), it is possible to restore an image based on the degraded image (to make the degraded image closer to its true image) by means of signal processing so long as f(x,y) that represents the point spread function PSF of blur is determined.

f(x,y) that represents the point spread function PSF of blur depends on the trajectory of camera shake during photographing (exposure). In other words, the trajectory of camera shake varies among shots of photography with a camera, so that f(x,y) also varies among shots of photography with a camera. Estimation of f(x,y) can be realized not only by estimation from one or more images photographed by a camera but also by using a sensor to detect a movement of a camera (a trajectory of camera shake) during photographing (exposure). However, f(x,y) is merely obtained by estimation or measurement and therefore includes some errors. Thus, it is difficult to perfectly restore the ideal image s(x,y).

Non-patent Document 2 discloses that the trajectory of camera shake within a short exposure time is assumed as "a uniform linear motion", and the Fourier transform of its point spread function PSF is approximated by a sinc function. Assuming that the width of camera shake is W and the direction of camera shake is the x-axis direction, F(u,v), which is the denominator of Formula 5, is expressed by Formula 6 shown below:

[Expression 6]

$$F(u, v) = \frac{\sin(W\pi u)}{W\pi u} \quad \text{(Formula 6)}$$

The right side of Formula 6 is a sinc function. The amplitude of the sinc function periodically reaches zero (0). This period is the inverse of the camera shake width W, i.e., 1/W. If the direction of camera shake forms angle θ with the x axis, F(u,v) is a rotation of the function of Formula 6 by angle θ. Since an actual camera shake exhibits a complicated trajectory, the assumption of "a uniform linear motion" does not sufficiently hold true in some cases.

The present inventor noticed that F(u,v) which is the denominator of Formula 5 periodically reaches zero in a low frequency region and this is a major cause of ringing artifacts in a flat portion of an image, and completed the present invention. Here, the "low frequency region" refers to a region of the frequency space near the origin or a region of an image in which the spatial frequency of the brightness distribution is relatively low. Such a low frequency region corresponds to a flat portion of the image (a portion which has a small brightness variation).

According to the present invention, image capture is realized in such a manner that F(u,v) would not reach zero in the low frequency region. Therefore, in repairing a degraded image which is attributed to camera shake or the like, ringing artifacts in a flat portion of the image (a low spatial frequency region) can be reduced. For a human eye, ringing artifacts in a flat portion of an image are conspicuous, and therefore, the quality of the image can be greatly improved by reducing the ringing artifacts in the flat portion.

In a preferred embodiment of the present invention, in photographing with a camera, out-of-focus blur is intentionally added to the image. In a preferred embodiment, as will be described later, one image capture element is used to obtain an image which does not have out-of-focus blur, and another image capture element is used to obtain an image which has intentionally-added out-of-focus blur. Then, the image signals obtained from these image capture elements are synthesized to produce a single degraded image. If camera shake occurs during photographing, this degraded image has both camera shake blur and out-of-focus blur, which are superimposed one on the other. Note that, in a preferred embodiment, the point spread function PSF which represents out-of-focus blur is known.

In this specification, the point spread function PSF of camera shake blur is expressed by $f_1(x,y)$, and the point spread function PSF of out-of-focus blur is expressed by $f_2(x,y)$. In this case, Formula 1, Formula 4 and Formula 5 can be deformed into Formula 7, Formula 8 and Formula 9, respectively:

[Expression 7]

$$i(x, y) = s(x, y) * (f_1(x, y) + f_2(x, y)) \quad \text{(Formula 7)}$$

[Expression 8]

$$I(u, v) = S(u, v) \cdot (F_1(u, v) + F_2(u, v)) \quad \text{(Formula 8)}$$

-continued

[Expression 9]

$$S(u, v) = \frac{I(u, v)}{F_1(u, v) + F_2(u, v)} \quad \text{(Formula 9)}$$

where $F_1(u,v)$ and $F_2(u,v)$ are the Fourier transforms of $f_1(x, y)$ and $f_2(x,y)$, respectively.

In a preferred embodiment of the present invention, the point spread function PSF of out-of-focus blur which is intentionally added to an image, i.e., $f_2(x,y)$, is known. In general, the point spread function PSF of out-of-focus blur can be expressed by a pillbox function or a Gaussian function. The Fourier transform of such a function would not reach zero in the vicinity of the zero frequency, i.e., in the low frequency region, so long as the degree of the out-of-focus condition is appropriately controlled.

In an embodiment of the present invention, function $F_2(u, v)$ which would not reach zero in the low frequency region is added to $F_1(u,v)$, whereby the denominator of Formula 9 is prevented from reaching zero at least in the low frequency region. As a result, ringing noise in a "flat portion" of an image is reduced, so that restoration of a high quality image in which ringing artifacts are not conspicuous can be realized. Hereinafter, the reason why creation of an out-of-focus condition enables reduction of ringing artifacts in a "flat portion" of an image is described.

Figure 4:
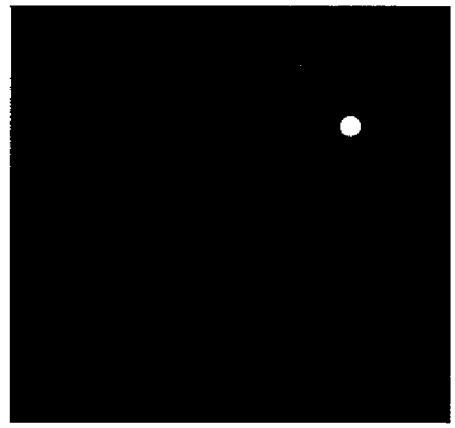
FIG. 4(a) is a diagram schematically showing an image in which a specific pixel has non-zero brightness while the other pixels have zero brightness (dot image).
FIG. 4(b) is a diagram showing the point spread function PSF of out-of-focus blur.
FIG. 4(c) is a diagram showing an image obtained by performing convolution of the point spread function PSF of out-of-focus blur on the image of FIG. 4(a).
Figure 4:
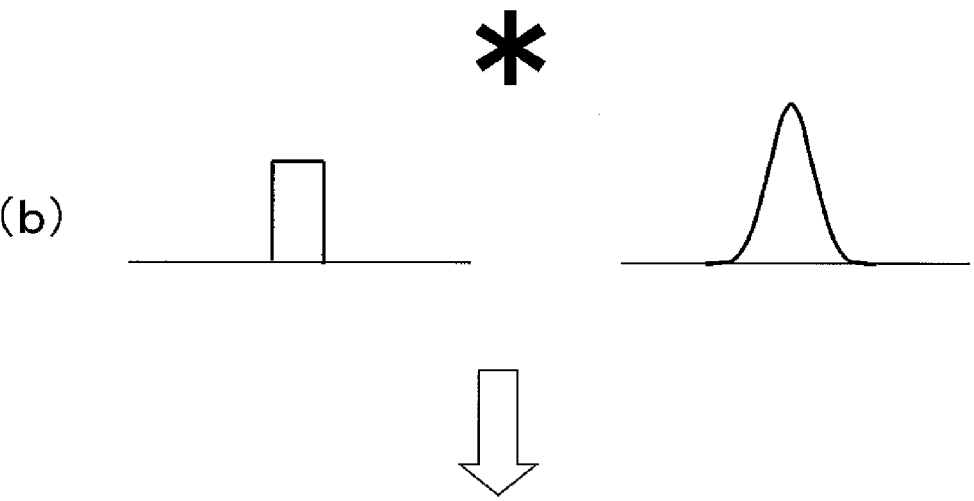
Figure 4:
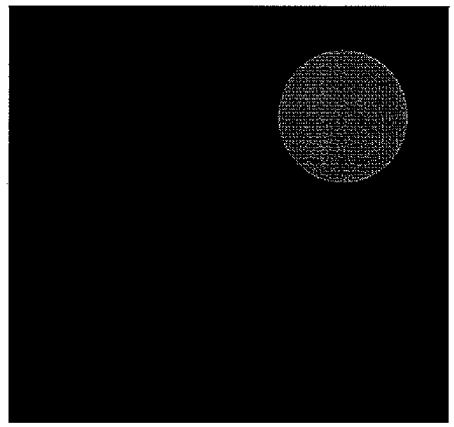

FIG. 4(a) is a diagram schematically showing an image in which a specific pixel has non-zero brightness while the other pixels have zero brightness (dot image). FIG. 4(b) is a diagram showing the point spread function PSF of out-of-focus blur. The graph in the left part of FIG. 4(b) shows an example of a pillbox function. The graph in the right part of FIG. 4(b) shows an example of a Gaussian function. FIG. 4(c) is a diagram showing an image obtained by performing convolution of the point spread function PSF of out-of-focus blur on the image of FIG. 4(a). The image of FIG. 4(c) has out-of-focus blur. In contrast to camera shake blur, this out-of-focus blur has a brightness distribution symmetrically spreading from the center. The degree of the blur is, strictly, defined by the point spread function PSF but, generally, can be evaluated by the extent (diameter or radius) of the dot image.

Next, details of out-of-focus blur is described.

Figure 5:
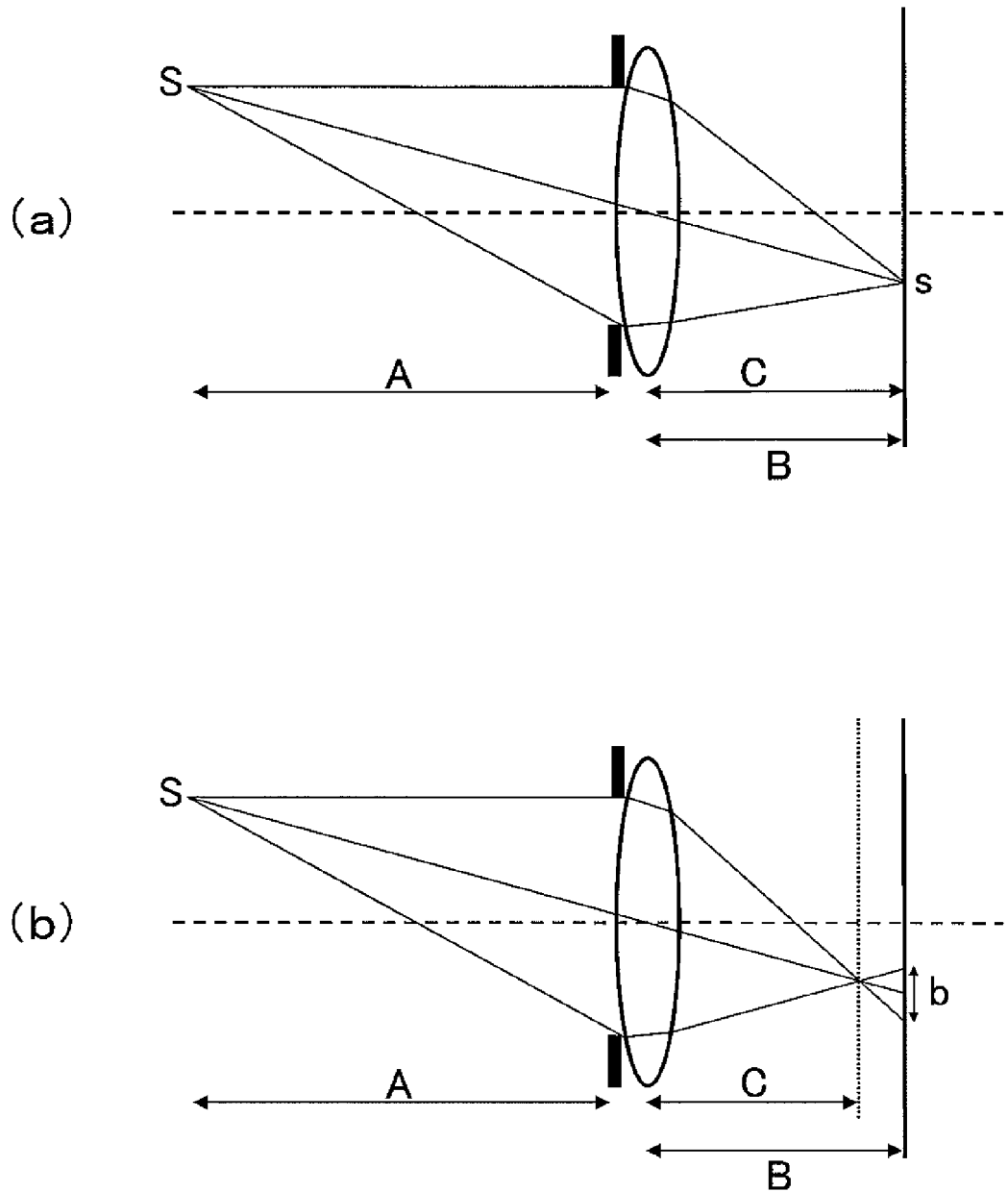
FIG. 5(a) is a ray diagram where a focus lens achieves an in-focus condition.
FIG. 5(b) is a ray diagram where the focus lens achieves an out-of-focus condition.

FIG. 5(a) is a ray diagram where a focus lens achieves an in-focus condition. FIG. 5(b) is a ray diagram where the focus lens achieves an out-of-focus condition. In the example of FIG. 5(a), point S which is separated from the lens by distance A forms an image of point s on an image capture plane which is separated from the lens by distance B.

In FIG. 5(a), distance B is equal to focal distance C of the lens. On the other hand, in FIG. 5(b), distance B is not equal to focal distance C of the lens, so that an image formed on the image capture plane is a blurred image, and its brightness distribution has the extent of diameter b.

The extent of the blur (diameter b) can be approximately expressed by Formula 10 as shown below:

[Expression 10] (Formula 10)

$$b \propto \gamma \left( \frac{1}{C} - \frac{1}{B} - \frac{1}{A} \right) \quad \text{(Formula 10)}$$

where γ is the aperture diameter of the lens.

As seen from Formula 10, the dimension of b varies depending on distance A between the lens and a photographic object at the time of image capture, distance B between the lens and the image capture plane, focal distance C, and lens aperture diameter γ.

The brightness distribution of a dot image on the image capture plane can be approximately expressed by, for example, a pillbox function or a Gaussian function according to the point spread function PSF which represents out-of-focus blur.

When this point spread function PSF is approximated by a pillbox function, the PSF, i.e., $f_2(x,y)$, is expressed by Formula 11 shown below:

[Expression 11]

$$f_2(x, y) = \frac{4}{\pi b^2} circ\left(\frac{\sqrt{(x^2 + y^2)}}{b}\right) \quad \text{(Formula 11)}$$

where circ (X) is a circular function which has the value of if the absolute value of X is not more than ½ but otherwise has the value of 0. On the other hand, when the point spread function PSF of out-of-focus blur is approximated by a Gaussian function, $f_2(x,y)$ is expressed by Formula 12 shown below:

[Expression 12]

$$f_2(x, y) = \frac{1}{2\pi\sigma^2} \exp\left(-\frac{(x^2 + y^2)}{2\sigma^2}\right) \quad \text{(Formula 12)}$$

σ is the standard deviation of the Gaussian distribution, which may have a value that is, for example, generally equivalent to the extent of the blur of the dot image (radius: b/2). In this way, the PSF of out-of-focus blur, i.e., $f_2(x,y)$, can be obtained by measurement from the image on the image capture plane shown in FIG. 5(b). Note that, as the aberration of the focus lens decreases, the approximation of the point spread function PSF by a pillbox function improves.

The Fourier transform of a pillbox function is the zeroth-order Bessel function of the first kind, $J_0$. The Fourier transform of a Gaussian function is a Gaussian function. Functions $F_2(u,v)$ of such characteristics either reach the maximum at $(u,v)=(0,0)$ and have relatively large values in the low frequency region. The Bessel function reaches zero at a specific frequency, whereas the Gaussian function would never reach zero. Therefore, in the low frequency region, $F_1(u,v)$ and $F_2(u,v)$ would not reach zero at the same frequency, and $F_1(u,v)+F_2(u,v)$ have a value which is different from zero.

As seen from the above description, according to the present invention, the denominator of Formula 9 would not reach zero at least in the low frequency region. As a result, ringing noise in a "flat portion" of an image can be reduced, and therefore, restoration of a high quality image in which ringing artifacts are not conspicuous can be realized.

Figure 6:
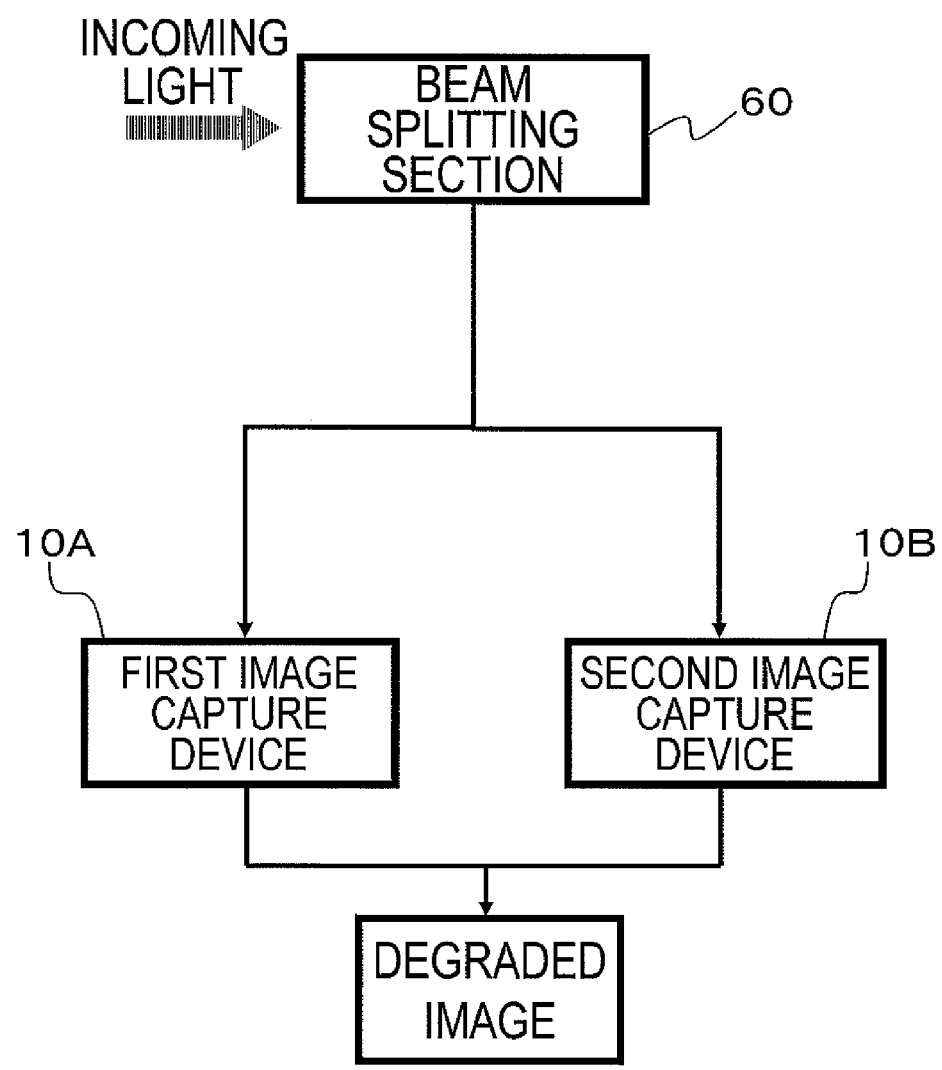
FIG. 6 is a diagram showing the configuration of an image capture section 100.

FIG. 6 is a diagram schematically showing the configuration of an image capture section of an image capture element of the present invention. In the present embodiment, light from a photographic object is split by a beam splitting section 60 into two parts. The beam splitting section 60 includes a lens and a beam splitter for splitting light transmitted through the lens into two beams traveling in different directions. One of the split beams from the beam splitting section 60 enters a first image capture element 10A and the other beam enters a second image capture element 10B. One of the image capture element 10A and the image capture element 10B is provided at a position where the focal point of the lens occurs, and the other is provided at a position where the focal point of the lens does not occur. This arrangement is realized by, for example, setting the optical distance from the lens to the first image capture element 10A and the optical distance from the lens to the second image capture element 10B to different values. A typical arrangement which achieves different optical distances can be realized by changing the physical distances, although the present invention is not limited to such an example.

Figure 7:
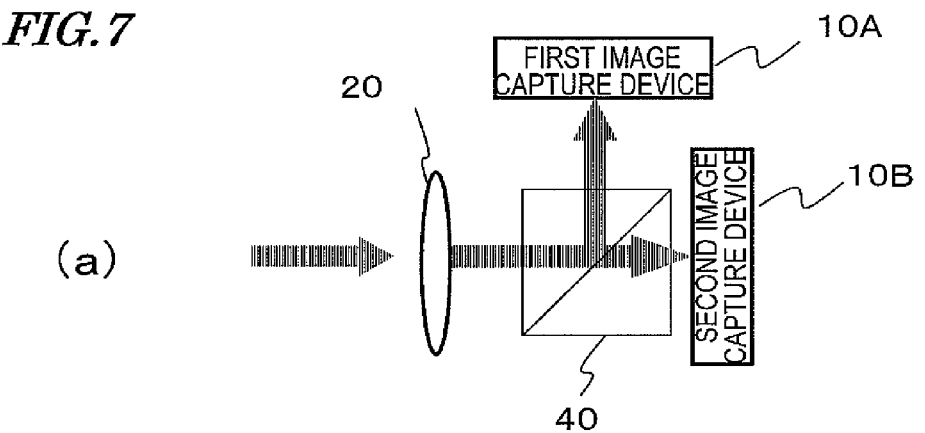
FIGS. 7(a) to 7(c) are diagrams each showing a specific example of the configuration of the image capture section 100.
Figure 7:
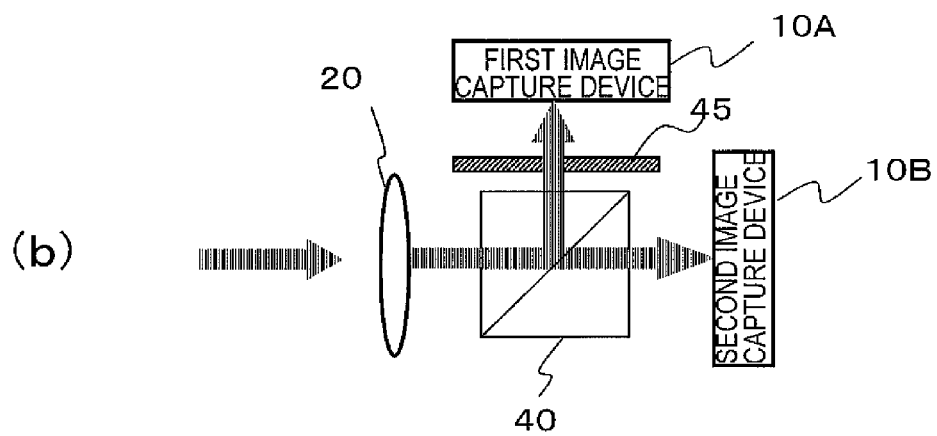
Figure 7:
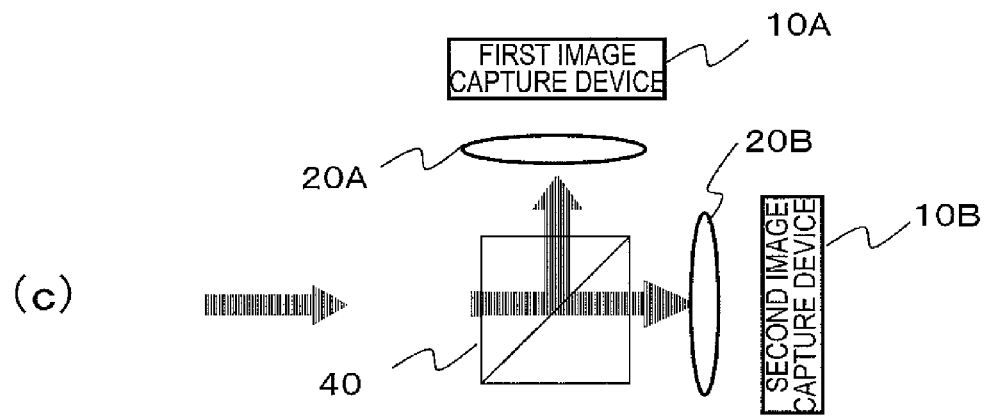

FIG. 7(a) is a diagram showing a configuration example where light transmitted through a lens 20 is divided by a beam splitter 40 into two beams traveling in different directions. In this configuration example, the distance from the lens 20 to the first image capture element 10A is longer than the distance from the lens 20 to the second image capture element 10B. FIG. 7(b) is a diagram showing another configuration example. In this configuration example, the distance from the lens 20 to the first image capture element 10A and the distance from the lens 20 to the second image capture element 10B are equal to each other. However, there is an optical element 45 between the lens 20 and the first image capture element 10A. The optical element 45 is made of a transparent material which has a different refractive index from that of air. With the intervention of the optical element 45 having such a property, the optical distance from the lens 20 to the first image capture element 10A and the optical distance from the lens 20 to the second image capture element 10B are different from each other. Therefore, the focusing condition is different between the first image capture element 10A and the second image capture element 10B. The optical element provided in the middle of the optical path may have any of a concave lens shape, a convex lens shape and a flat plate shape, or a complex shape thereof, so long as the optical element can produce a difference in focusing condition at the image capture planes of the image capture elements 10A, 10B.

FIG. 7(c) is a diagram showing still another configuration example. In this configuration example, light is divided by the beam splitter 40 into two beams traveling in different directions, and the two beams are condensed by different lenses 20A and 20B, respectively. When the lenses 20A and 20B have equal focal distances, the system is configured such that the distance from the lens 20A to the first image capture element 10A and the distance from the lens 20B to the second image capture element 10B are different from each other. Note that the lens characteristics, such as focal distance, may be different between the lens 20A and the lens 20B. Even when such a configuration is adopted, the point spread function that defines out-of-focus blur which is intentionally generated in the second image capture element 10B can be obtained beforehand under various photographing conditions.

Thus, according to a preferred embodiment of the present invention, a signal of an image which is in focus is obtained from one of the two image capture elements 10A, 10B, and a signal of an image which is out of focus is obtained from the other image capture element. These signals are added together to generate a signal of a degraded image. The thus-obtained degraded image is subjected to a restoration process, whereby occurrence of a ringing artifact can be prevented.

Hereinafter, an embodiment of an image capture device of the present invention is described.

Figure 8:
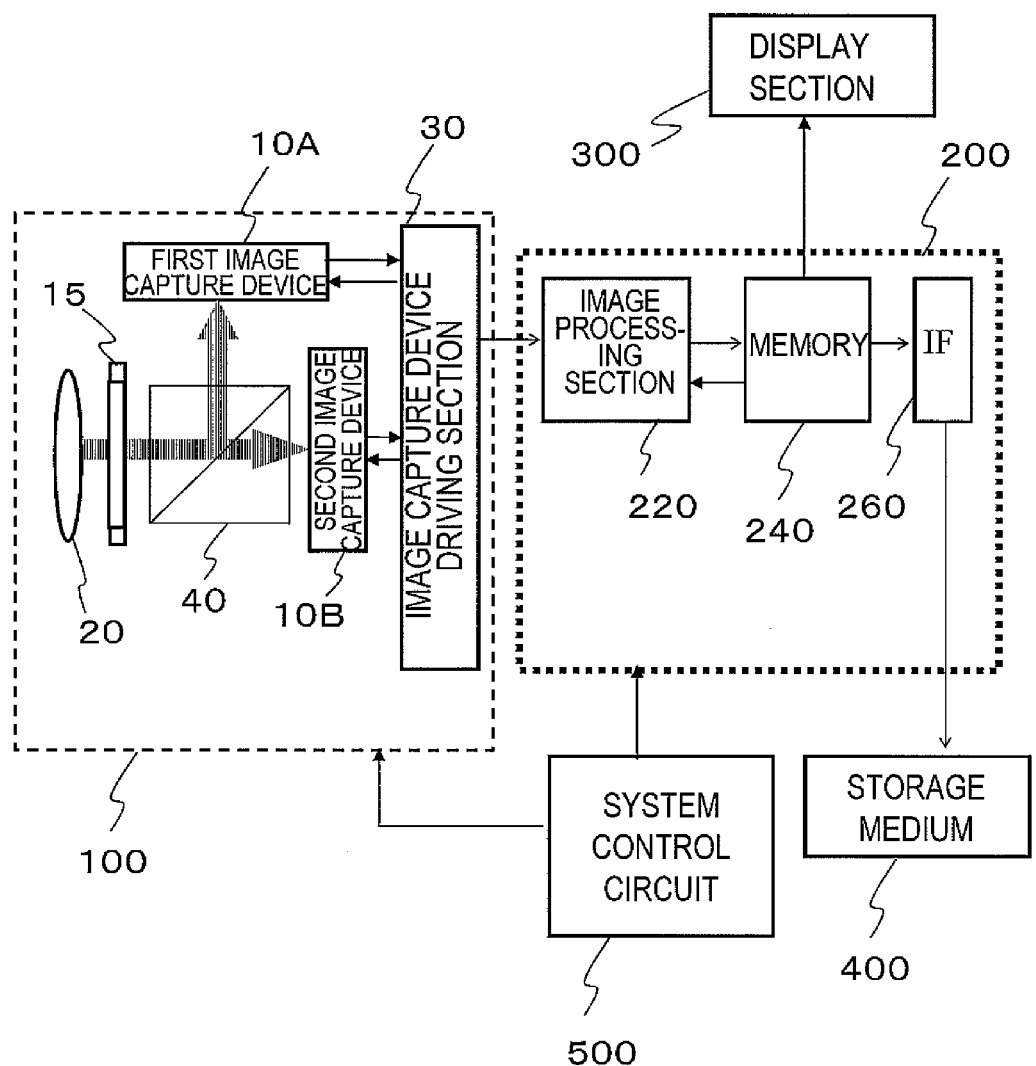
FIG. 8 is a block diagram showing a general configuration of the image capture device of the present embodiment.

FIG. 8 is a block diagram showing a general configuration of the image capture device of the present embodiment.

The image capture device of the present embodiment is a digital electronic camera, to which the present invention is not limited. The image capture device of the present embodiment includes, as shown in FIG. 8, an image capture section 100, a signal processing section 200 for performing various signal processes, a captured image display section 200 for displaying an image obtained by image capture, a storage section 400 for storing data of images, and a system control section 500 for controlling the respective sections. Major differences of the image capture device of the present embodiment from known image capture devices reside in the configuration of the image capture section 100 and the operation of the signal processing section 200. Therefore, in the description which will be provided below, the image capture section 100 and the signal processing section 200 are mainly described in detail.

The image capture section 100 of the present embodiment includes a photography lens 20, a shutter 15 which has the function of a lens stop, a beam splitter 40 for splitting light transmitted through the photography lens 20 into two beams, and two image capture elements 10A, 10B for receiving the beams split by the beam splitter 40. The image capture elements 10A, 10B include a plurality of photosensitive cells (photodiodes) arranged over the image capture plane. A typical example of the image capture elements 10A, 10B is a CCD or a CMOS sensor. The photography lens 20 has a known configuration and may be, in actuality, a lens unit which is formed by a plurality of lenses. The shutter 15 and the photography lens 20 are driven by an unshown mechanism to perform operations which are necessary for optical zooming, Auto Exposure (AE) and Auto Focus (AF).

The image capture section 100 further includes an image capture element driving section 30 for driving the image capture elements 10A, 10B. The image capture element driving section 30 may be realized by, for example, a semiconductor integrated circuit, such as a CCD driver. The image capture element driving section 30 drives the image capture elements 10A, 10B to read out an analog signal (photoelectrically converted signal) from the image capture elements 10A, 10B and convert the analog signal to a digital signal. According to the present embodiment, the function of the beam splitter 40 enables simultaneous capturing of images of the same object by the image capture elements 10A, 10B. One of the image capture elements, 10A, performs image capture in an in-focus condition, while the other image capture element, 10B, performs image capture in an out-of-focus condition. Therefore, the image capture element driving section 30 reads out photoelectrically converted signals from both of the two image capture elements 10A, 10B and then adds the signals together to generate an image signal. An image expressed by such an image signal is a degraded image which includes intentionally-produced out-of-focus blur. Data of this degraded image is input to the signal processing section 200.

Note that, in the present embodiment, the difference between the actual distance from the photography lens 20 to the first image capture element 10A and the actual distance from the photography lens 20 to the second image capture element 10B is constant. When the image is in focus at the first image capture element 10A, the point spread function that defines out-of-focus blur which is produced in the second image capture element 10B is known. This point spread function can be obtained from an existing table according to the photographing parameters, such as the focal distance of the photography lens 20 and the aperture diameter of the lens stop.

The signal processing section 200 of the present embodiment includes an image processing section (image processor) 220, a memory 240, and an interface (IF) section 260. The signal processing section 200 is coupled to a display section 300, such as a liquid crystal display panel, and a storage medium 400, such as a memory card.

The image processing section 220 performs various signal processing, such as color tone correction, change of resolution, and data compression, as well as the inventive restoration process on a degraded image. The image processing section 220 is preferably realized by a combination of hardware, such as a known digital signal processor (DSP), and software for execution of image processing. The memory 240 may be formed by a DRAM or the like. The memory 240 stores image data obtained from the image capture section 100 and, meanwhile, temporarily stores image data which have undergone various image processing or image data which have been compressed in the image processing section 220. The image data are converted to analog signals and thereafter displayed in the display section 300. Alternatively, the image data which remain in the form of digital signals are stored in the storage medium 400 via the interface section 260. The image data may be transmitted to another apparatus (not shown) via an unshown wireless or wired communication device.

When a user aims his camera at a photographic object, it is preferred that an image obtained by the first image capture element 10A is displayed in the display section 300. This enables the user to perform photographing while observing an image which does not have out-of-focus blur.

The above components are controlled by the system control section 500 that includes an unshown central processing unit (CPU) and a flash memory. Note that the image capture device of the present embodiment may include other known components, such as an optical viewfinder, a power source (battery), and a flashlight. However, descriptions of such components are not particularly necessary for understanding of the present invention and are therefore omitted.

As described above, according to the image capture device 100 of the present embodiment, an in-focus image can be formed on the image capture plane of the image capture element 10A while an image which is intentionally kept out of focus can be formed on the image capture element 10B. Note that the image that is in focus on the image capture plane of the image capture element 10A can readily be formed using a common auto-focus technique.

Suppose that, in photographing an image which is intentionally kept out-of-focus, motion blur is produced due to camera shake during exposure. The point spread function PSF of the thus-produced blur of the image is, as previously described, equal to the sum of $f_1(x,y)$ and $f_2(x,y)$.

Next, how to determine the PSF of out-of-focus blur, i.e., $f_2(x,y)$, is described.

Figure 9:
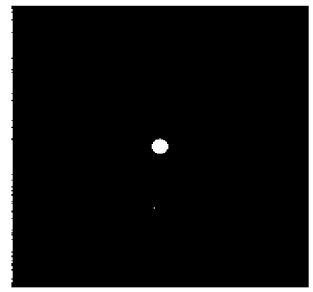
FIG. 9(a) is a diagram showing a pattern which has a small bright dot at the center on a black background.
FIG. 9(b) is a diagram showing an image which is in focus on an image capture plane of an image capture element 10A.
FIG. 9(c) is a diagram showing an image which is out of focus on an image capture plane of an image capture element 10B.
Figure 9:
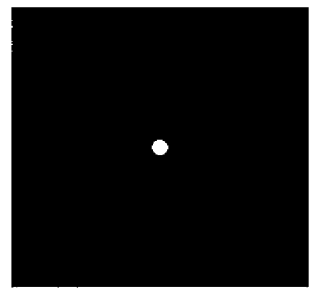
Figure 9:
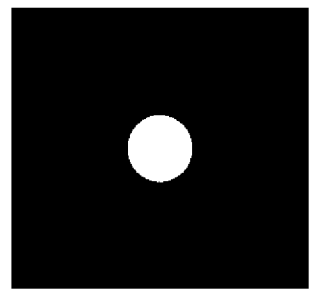

First, as shown in FIG. 9(a), a pattern is photographed which has a bright dot at the center on a black background. Here, in the first image capture element IAA, a formed image is in focus as shown in FIG. 9(b). Meanwhile, in the second image capture element 10B, a formed image is out of focus as shown in FIG. 9(c).

When the PSF of out-of-focus blur is approximated by a pillbox function in which the dot spreads in the form of a cylinder, the extent of the dot image on the image capture plane (diameter b) is equivalent to the diameter of the cylinder. Thus, by measuring the extent of the dot image, the PSF (pillbox function) which represents out-of-focus blur can be determined. The extent of the dot image can be expressed by the number of pixels on the image capture plane and can be readily detected by an image capture element.

In some cases, the in-plane brightness of the dot image exhibits a Gaussian distribution because of the shape of the lens, e.g., due to aberration. In those cases, it is preferred that the PSF of out-of-focus blur is approximated by a Gaussian function. Since the brightness distribution of the dot image spreading over the image capture plane is measured by an image capture element, σ of a corresponding Gaussian function can be determined from the measured brightness distribution.

Thus, the PSF which defines out-of-focus blur ($f_2(x,y)$) is determined beforehand by measurement and stored in, for example, a table of a memory incorporated in the image capture device. This PSF ($f_2(x,y)$) also depends on the photographing parameters, such as the focal distance of the photography lens 20 and the aperture diameter of the lens stop. Specifically, if the distance to the photographic object varies, the focal distance of the photography lens 20 also varies. If the aperture diameter varies, the depth of field also varies. Therefore, it is preferred that a large number of PSFs ($f_2(x,y)$) are measured and stored in the memory in association with possible combinations of photographing parameter values. With such data prepared, in actual photographing, the PSF of out-of-focus blur ($f_2(x,y)$) can be obtained according to the photographing parameters.

Next, the user's operation in image capture with the use of the image capture device of the present embodiment is described.

First, as in usual photographing with a digital camera, a user aims his camera at a photographic object and presses a shutter release button halfway, whereby the focus is adjusted on the object by an auto-focus operation such that an in-focus image is formed at the first image capture element 10A. At this point in time, the in-focus image is formed on the image capture plane of the first image capture element 10A, while an image formed on the image capture plane of the second image capture element 10B has blur due to an out-of-focus condition.

Next, when the user fully presses the shutter release button, the "exposure" process of the image capture elements 10A, 10B is started. If the image capture device is unstably moved by a user during the exposure process, the images slide over the image capture planes of the image capture elements 10A, 10B. As a result, camera shake blur is added to each of the images.

The signal processing section 200 receives a signal obtained by the image capture section 100. The thus-obtained image is a degraded image which is expressed by $i(x,y)$ on the left side of Formula 7. In the present embodiment, $i(x,y)$ is obtained by adding together the image signals output from the image capture elements 10A, 10B. The outputs from the image capture elements 10A, 10B may be simply added together. Alternatively, one and the other of the outputs may be differently weighted before being added together. Such weighting is preferably performed when the image capture elements 10A, 10B are different in at least any of size, resolution, number of pixels, and aperture ratio, or when the light beams that are incident on the image capture elements 10A, 10B have different intensities.

In the signal processing section 200, the image processing section 220 performs a process to restore $s(x,y)$ based on $i(x,y)$. The algorithm of this restoration process is not limited to a particular one but may be any of known image restoration processes.

Figure 10:
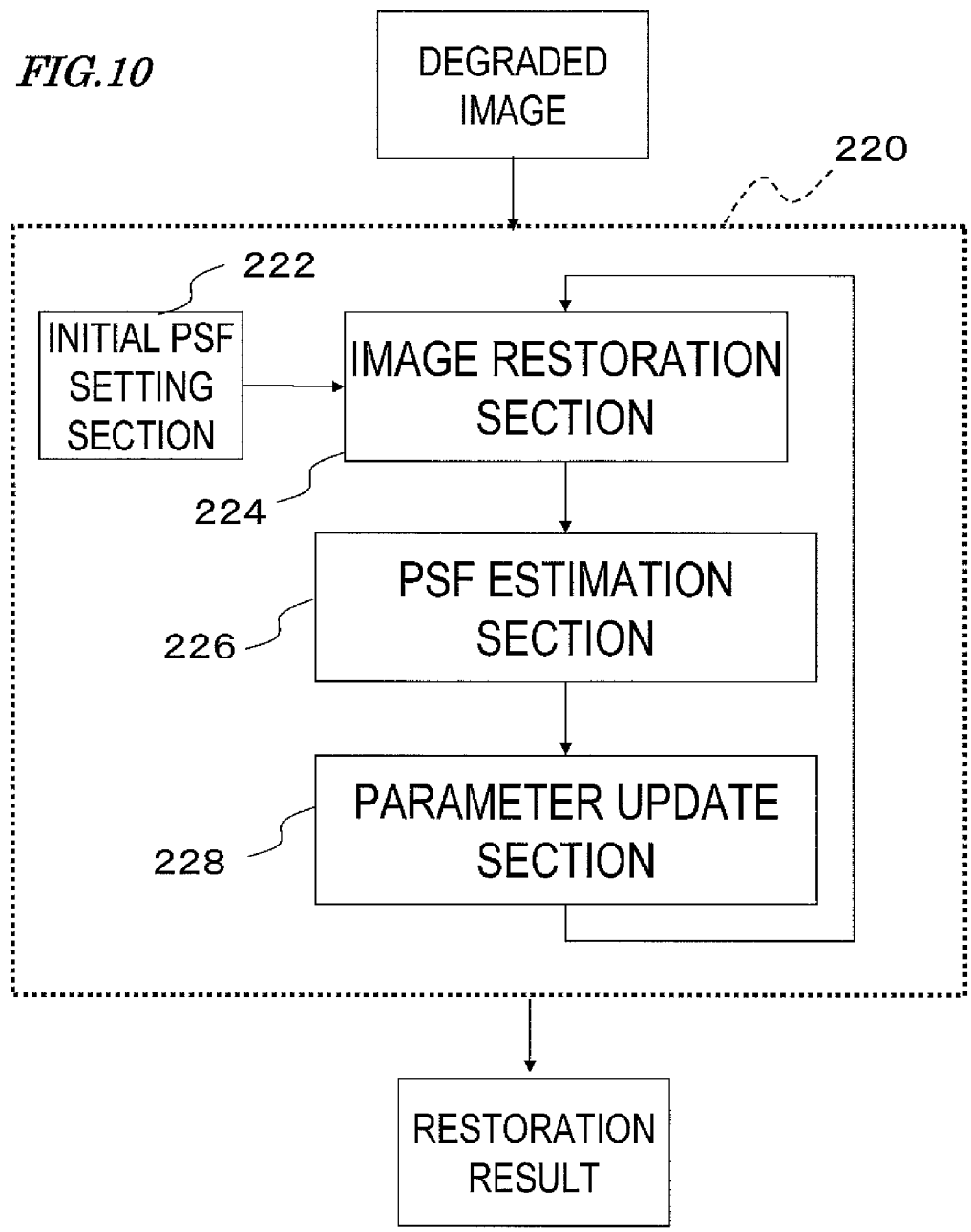
FIG. 10 is a block showing a configuration example of the image processing section 220 shown in FIG. 8.
Figure 11:
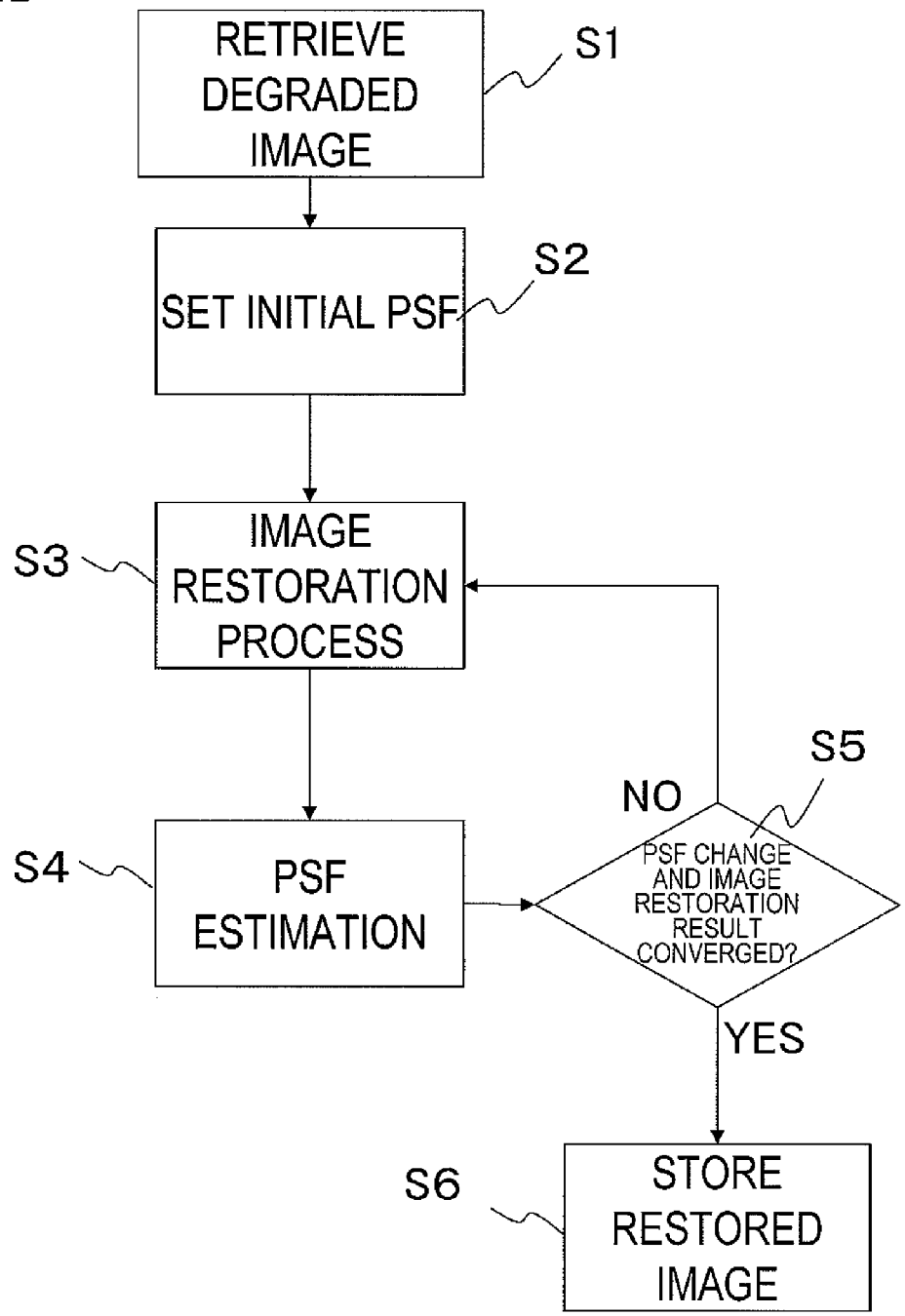
FIG. 11 is a flowchart which illustrates an example of a restoration process which is performed in an embodiment of the present invention.

Hereinafter, an example of the restoration process which can be performed in the present embodiment is described with reference to FIG. 10 and FIG. 11. FIG. 10 is a block showing a configuration example of the image processing section 220 shown in FIG. 8. FIG. 11 is a flowchart which illustrates an example of the restoration process.

First, refer to FIG. 10. The image processing section 220 shown in FIG. 10 includes an initial PSF setting section 222, an image restoration section 224, a PSF setting section 226, and a parameter update section 228. The image processing section 220 receives a degraded image as the input and outputs a restoration result. The initial PSF estimation section 222 sets an initial PSF which is necessary for the operation of the image restoration section 224. The initial PSF may be determined based on a motion (trajectory) of a camera which is detected by a sensor, such as a gyro sensor. Alternatively, the initial PSF may be manually entered by a user. Note that, from the viewpoint of reducing the time that is required for the image processing, the initial PSF is preferably closer to the true PSF. Thus, a PSF obtained by adding the PSF of out-of-focus blur to the PSF that is determined from the camera trajectory detected by the sensor is preferably set to the initial PSF.

The image restoration section 224 produces a restored image from a degraded image based on the initial PSF. The PSF estimation section 226 performs estimation of the PSF based on the degraded image and the restored image produced by the image restoration section 224. The parameter update section 228 updates the initial PSF (a PSF used for the previous image restoration) with a PSF obtained by the PSF estimation section 226 (estimated PSF). The updated PSF is given to the image restoration section 224, and the above procedure is repeatedly performed.

The configuration shown in FIG. 10 is an example of the function block of the image processing section 220. The image processing section 220 may be divided into other function blocks. The image processing section 220 is preferably realized by, for example, incorporating image processing software into known hardware.

Next, a general procedure of the restoration process is described with reference to FIG. 11.

First, in Step S1, a degraded image is retrieved. Specifically, the image processing section 220 retrieves from the memory 240 of FIG. 8 a degraded image which is to be used as the base of the restoration, process. The degraded image is an image obtained by the image capture section 100 of FIG. 8. In the present embodiment, the degraded image has intentionally-added out-of-focus blur. In general, a degraded image has camera shake blur (motion blur) due to a shake (motion) of the image capture section 100 which is caused by a user.

In Step S2, the initial PSF setting section 222 sets the initial PSF. In Step S3, the image restoration section 224 performs an image restoration process using the degraded image obtained in Step S1 and the initial PSF set in Step S2. This image restoration process can be performed in the image restoration section 224 of FIG. 10 according to a known restoration algorithm. The image restoration section 224 temporarily stores a resultant restored image in the memory 240. In Step S4, the PSF estimation section 226 performs estimation of the PSF from the restored image, and the parameter update section 228 updates the current PSF with the estimated PSF.

In Step S5, it is determined whether or not a change of the PSF caused by the update and a change of the restored image caused by the update are smaller than predetermined thresholds. If they are smaller, it is determined that the process have converged. In Step S6, a restoration result is stored in the memory 240.

Hereinafter, details of the PSF estimation and the image restoration in Step S2 to Step S3 are described.

Here, a process which is performed according to a signal processing method disclosed in Non-patent Document 1 is described. According to the signal processing method of Non-patent Document 1, first of all, it is necessary to give the initial PSF. This initial PSF is given manually or by means of a camera shake detecting device (an external device, such as a gyro sensor). Based on this initial PSF, the first image restoration is performed. Although the PSF in this phase is not necessarily identical with a true PSF (correct answer), the result of the restoration is closer to the original image than the degraded image is.

Then, the PSF is estimated from the first restored image that is the result of the first image restoration. Since the first restored image is closer to the original image than the degraded image is, the estimated PSF approaches to the correct answer. The PSF estimated herein is used to perform the second image restoration. In other words, the initial PSF is updated with the subsequent PSF, and the updated initial PSF is used to perform the second image restoration. This process is repeated till the change of the PSF and the change of the image restoration result become zero, whereby the PSF estimation and the image restoration are simultaneously performed.

Hereinafter, a more specific method of the image restoration process is described.

First, prior to image restoration, the initial PSF is given by the initial PSF setting section 222. According to the method disclosed in Non-patent Document 1, the initial PSF is manually given, whereas in the present embodiment, the initial value of the PSF is set based on motion data obtained by a gyro sensor.

The image restoration section 224 performs restoration of an image based on the given PSF (the initial value for the first cycle, updated values for subsequent cycles) and a degraded image. The evaluation formula $E_L$ for use in this process is shown as Formula 13:

[Expression 13]

$$E_L = \left(\sum_{\partial^* \in \Theta} w_{k(\partial^*)} \|\partial^* L \otimes f - \partial^* I\|_2^2\right) + \lambda_1 \|\Phi(\partial_x L) + \Phi(\partial_y L)\|_1 +$$
$$\lambda_2(\|\partial_x L - \partial_x I\|_2^2 \cdot M + \|\partial_y L - \partial_y I\|_2^2 \cdot M).$$
(Formula 13)

where I is the degraded image, L is an image which does not have motion blur or out-of-focus blur, and f is the point spread function PSF. Variables wk, λ1 and λ2 are the "weights" that are manually set. Θ is a set of operators which define what differentiation is to be performed on the image. Specifically, the set of operators includes six differential parameters in total, the zeroth-order differential, the first-order differentials (a differential which is differentiated once for the x direction and a differential which is differentiated once for the y direction), and the second-order differentials (a differential which is differentiated twice for the x direction, a differential which is differentiated twice for the y direction, and a differential which is differentiated once for the x direction and once for y direction). d* is a differential operator. An expression of B with the use of d* is $\Theta=\{d^0, d_x, d_y, d_{xx}, d_{xy}, d_{yy}\}$. d* enables a process which uses both the brightness data and the edge data. It is therefore possible to obtain data which would not be obtained only with the brightness. M is a two-dimensional mask which has elements '1' in pixels included in a flat region of the image, i.e., in a local smooth region (Ω), and elements '0' in the other pixels. $\|\cdot\|_p$ is a p-norm operator. Φ(x) is a function which approximately represents the relationship between the brightness gradient x in a naturally observed image and its distribution density (logarithmic representation).

The first term of the right side of Formula 13 represents the difference (distance) between an image obtained by convolution of the restored image L and the point spread function f and a degraded image I. By carrying out an operation on the image with the six differential parameters, the degree of approximation of the image can be evaluated based on data other than the brightness.

The second term of the right side of Formula 13 represents the property of the brightness gradient in the image (which is called "heavy tail"). $\Phi(d_x L)$ and $\Phi(d_y L)$ have a statistic property such that, when the brightness gradient of the restored image is put into a histogram representation, a sharp peak of the frequency occurs near zero gradient, and the frequency decreases as the gradient increases. In the second term, for each of the gradient in the x direction and the gradient in the y direction, the distance from a distribution which represents the above statistic property is calculated. This statistic property is also utilized in the methods disclosed in Non-patent Documents 3 to 5.

The third term of the right side of Formula 13 is a term for evaluation of the degree of flatness with the use of the mask M, the differentiated degraded image, and the differentiated restored image. In a flat region, the brightness gradient values of the degraded image and the restored image are close to each other. Therefore, the errors of the gradient values in the x, y directions are used as the evaluation values.

By obtaining a value for L which minimize the right side of Formula 13, the restored image L can be obtained (optimization of L). A specific calculation method for the optimization of L is disclosed in Non-patent Document 1.

Next, a process performed by the PSF estimation section 226, which is to be performed after the restored image L has been obtained, is described in detail.

The PSF estimation is the problem of estimating the point spread function f with the use of the restored image L obtained at the image restoration section 224 and the degraded image I. f is determined such that the right side of Formula 14 shown below is minimized, whereby the point spread function f can be obtained (optimization of f).

[Expression 14]

$$E(f) = \left(\sum_{\partial^* \in \Theta} w_{k(\partial^*)} \|\partial^* L \otimes f - \partial^* I\|_2^2\right) + \|f\|_1.$$
(Formula 14)

The first term of the right side of Formula 14 is equivalent to the first term of the right side of Formula 13 and serves as a reference for evaluation which represents whether or not the convolution of the restored image L and the point spread function f is close to the degraded image I. The second term of the right side of Formula 14 is one norm of the point spread function f. The second term is based on a concept called "sparse coding". This optimization term is used because large part of the elements in the matrix of the point spread function f are zero (inactive). In the present embodiment, the optimization is performed according to the "interior point method" as in Non-patent Document 1, whereby the total optimization can be realized.

The procedure of image restoration is not limited to the example described above. For example, the Richardson-Lucy (LR) method or the Wiener filtering method may be used.

The important point in the image restoration of the present embodiment is that the point spread function PSF of intentionally-added out-of-focus blur is known. Since data of motion can be obtained by a gyro sensor, even if an out-of-focus condition occurs, restoration of an image can be realized by applying a traditionally-known convenient method, such as the LR method, so long as the point spread function PSF of the out-of-focus blur is known. Therefore, the load on the signal processing can be reduced.

In the present embodiment, image restoration is realized by blind deconvolution where a PSF which defines camera shake blur is also an object of estimation. However, the present invention is not limited to this example. If a "camera shake trajectory" can be detected with high accuracy using a gyro sensor attached to the image capture device, the PSF obtained based on the detected camera shake trajectory may be used not only as the initial value for the image restoration process but also as the final PSF that defines the camera shake blur. In this case, a PSF which defines out-of-focus blur is also known, and all the point spread functions of blur are known, so that what is to be estimated is only the restored image.

According to the present embodiment, intentional out-of-focus blur is added to a degraded image irrespective of the type of the restoration method. Therefore, even when image restoration is performed on an image degraded due to camera shake blur (motion blur), the effect of making ringing artifacts inconspicuous in a flat portion of the image is obtained.

In the above-described embodiment, when an image is in focus at the first image capture element 10A, a point spread function which defines out-of-focus blur produced in the second image capture element 10B is known. However, the present invention is not limited to such an example. When the point spread function which defines out-of-focus blur is know, accurate removal of motion blur and obscurity is possible.

Note that there is a probability that both of images obtained by the two image capture elements 10A, 10B have out-of-focus blur. Even in such a case, it is possible to estimate a PSF which defines total blur of a synthesized degraded image and obtain a restored image. Since the synthesized image produced from images obtained by the two image capture elements 10A, 10B does not need to be in focus, there is an advantage that focus adjustment is not necessary. For example, when a landscape which has a certain depth is a photographic object, the focus is not necessarily on the object. Even in such a case, the present invention is effective. In a preferred embodiment of the present invention, when an out-of-focus condition occurs in both of the two image capture elements 10A, 10B, the point spread functions which define the respective out-of-focus blurs are different from each other. In this case, none of the Fourier transforms of the two point spread functions which define the out-of-focus blurs reaches zero at a specific spatial frequency. Therefore, by creating an out-of-focus condition in both of the two image capture elements 10A, 10B, the effect of preventing ringing is further improved.

The first image capture element 10A and the second image capture element 10B do not need to have equal resolutions. For example, when one of the devices has a smaller resolution than the other, the resolution of one of the images can be increased using the super-resolution technique (for example, Wei, Tanaka, Okutomi, "Real-time Video Super Resolution Processing System," Proceedings of the 15th Image Sensing Symposium (SSII2009), pp. DS2-01-1-1, 2009). Images of different resolutions may be converted so as to have equal resolutions before the converted images are subjected to the above-described image restoration process to reduce motion blur and obscurity.

The number of image capture elements included in the present invention is not limited to two, but may be three or more.

INDUSTRIAL APPLICABILITY

An image capture device of the present invention is capable of restoring an image which has small ringing artifacts in a flat portion and is therefore applicable to, for example, electronic still cameras.

| REFERENCE SIGNS LIST | |
|---|---|
| 10A | first image capture element |
| 10B | second image capture element |
| 15 | shutter with lens stop function |
| 20 | photography lens |
| 30 | image capture element driving section |
| 40 | beam splitter |
| 45 | optical element |
| 60 | beam splitting section |
| 100 | image capture section |
| 200 | signal processing section |
| 220 | image processing section |
| 222 | initial PSF setting section |
| 224 | image restoration section |
| 226 | PSF estimation section |
| 228 | parameter update section |
| 240 | memory |
| 260 | interface (IF) |
| 300 | display section |
| 400 | storage section |
| 500 | system control section |

The invention claimed is:

1. An image capture device, comprising:
a first image capture element and a second image capture element;
an optical system which is capable of forming a first image which is in focus on an image capture plane of the first image capture element and forming a second image which is out of focus on an image capture plane of the second image capture element; and
an image processing section for processing a first signal obtained from the first image capture element and a second signal obtained from the second image capture element,
wherein the image processing section is configured to add the first signal and the second signal to generate a signal of a degraded image, and is configured to produce a restored image from the signal of the degraded image, the restored image having reduced camera shake blur and reduced out-of-focus blur.

2. The image capture device of claim 1, further comprising a memory for storing a point spread function which defines out-of-focus blur in the second image capture element, wherein
the image processing section retrieves from the memory a point spread function which defines out-of-focus blur caused during image capture and uses the retrieved point spread function for production of the restored image.

3. The image capture device of claim 1, wherein the optical system includes
a focus lens, and
a beam splitter for splitting light transmitted through the focus lens into two beams traveling in directions, wherein one of the split beams enters the first image capture element while the other enters the second image capture element.

4. The image capture device of claim 3, wherein an optical distance from the focus lens to the first image capture element is different from an optical distance from the focus lens to the second image capture element.

5. The image capture device of claim 1, wherein the optical system includes
- a beam splitter for splitting incoming light into two beams traveling in different directions,
- a first focus lens for condensing one of the split beams on the first image capture element, and
- a second focus lens for condensing the other one of the split beams on the second image capture element.

6. The image capture device of claim 1, further comprising a display section,
wherein an image obtained by the first image capture element is displayed in the display section.

7. A non-transitory computer-readable medium storing a program for controlling an operation of an image capture device, the image capture device including a first image capture element and a second image capture element, an optical system which is capable of forming a first image which is in focus on an image capture plane of the first image capture element and forming a second image which is out of focus on an image capture plane of the second image capture element, and an image processing section for processing a first signal obtained from the first image capture element and a second signal obtained from the second image capture element, the program comprising the steps of:
- controlling the optical system to form a first image which is in focus on the image capture plane of the first image capture element and a second image which is out of focus on the image capture plane of the second image capture element; and
- instructing the image processing section to add the first signal and the second signal to generate a signal of a degraded image, and to produce a restored image from the signal of the degraded image, the restored image having reduced camera shake blur and reduced out-of-focus blur.

8. An image processing method for an image capture device, the image capture device including a first image capture element and a second image capture element, an optical system which is capable of forming a first image which is in focus on an image capture plane of the first image capture element and forming a second image which is out of focus on an image capture plane of the second image capture element, and an image processing section for processing a first signal obtained from the first image capture element and a second signal obtained from the second image capture element, the method comprising the steps of:
- controlling the optical system to form a first image which is in focus on the image capture plane of the first image capture element and a second image which is out of focus on the image capture plane of the second image capture element; and
- instructing the image processing section to add the first signal and the second signal to generate a signal of a degraded image, and to produce a restored image from the signal of the degraded image, the restored image having reduced camera shake blur and reduced out-of-focus blur.

9. An image processing method for an image capture device, the image capture device including a first image capture element and a second image capture element, an optical system and an image processing section for processing a first signal obtained from the first image capture element and a second signal obtained from the second image capture element, the method comprising the steps of:
- controlling the optical system to form a first image which is out of focus on an image capture plane of the first image capture element and a second image which is out of focus on an image capture plane of the second image capture element; and
- instructing the image processing section to add the first signal and the second signal to generate a signal of a degraded image, and to produce a restored image from the signal of the degraded image, the restored image having reduced camera shake blur and reduced out-of-focus blur.

* * * * *